United States Patent Office 3,001,829
Patented Sept. 26, 1961

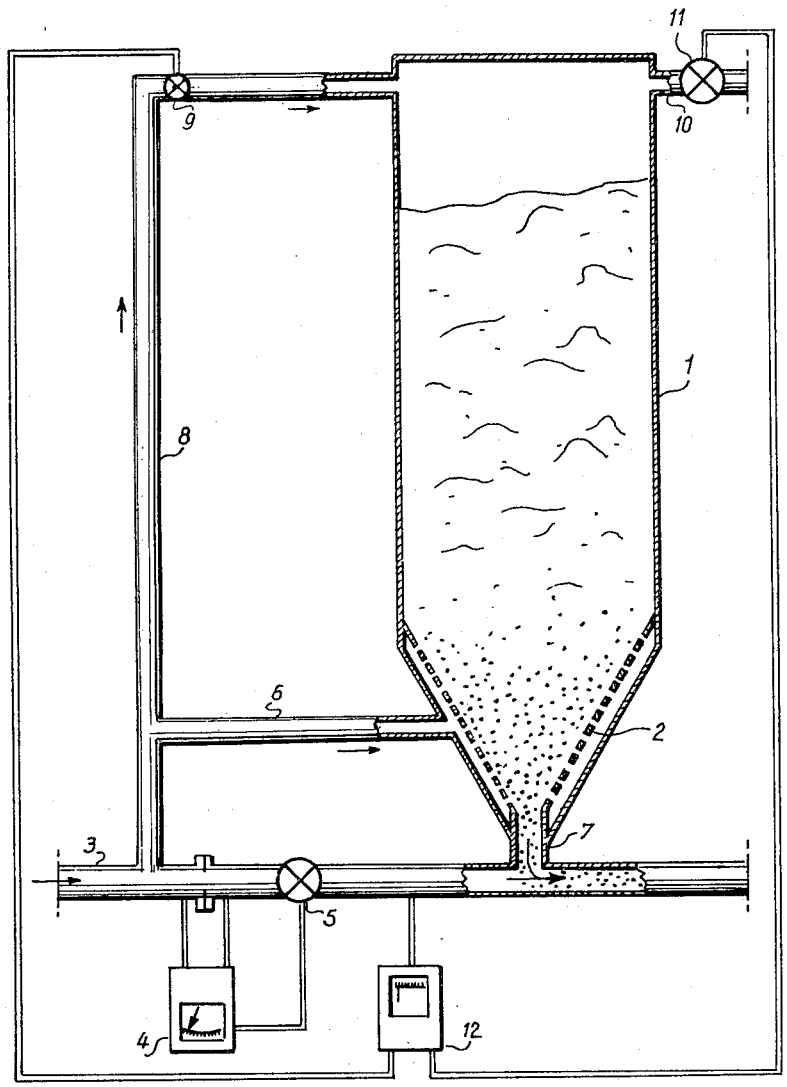

3,001,829
ARRANGEMENT FOR THE AUTOMATIC ADJUSTMENT OF A DISTRIBUTOR OF PULVERULENT MATERIAL UNDER PRESSURE
Lucien de Saint-Martin, Le Pecq, France, assignor to Institut de Recherches de la Siderurgie Francaise, Saint Germain-en-Laye, France, a professional institution of France
Filed Mar. 8, 1960, Ser. No. 13,538
Claims priority, application France Mar. 21, 1959
3 Claims. (Cl. 302—53)

The present invention has for its object an arrangement for the automatic adjustment of a distributor of pulverulent material operating under pressure, of the type disclosed, for instance, in applicant's copending application claiming priority of the French patent filed on March 11, 1959, for a static distributor of pulverulent lime, by Institut de Recherches de la Siderurgie Francaise.

It has been possible to produce, in accordance with techniques resorting to the blowing of pulverulent material, the automatic operation under pressure of a distributor of pulverulent material, but solely in the case where no adjustment of the pulverulent throughputs of the latter was required. Whenever it was desired to adjust at any moment the throughput of pulverulent material or to keep it at a constant value, it was necessary to act by hand on the cocks controlling the input of material into the apparatus.

Now, distributors of pulverulent material operating under pressure, of the type disclosed hereinabove, include generally a circuit setting the distributor under pressure and connected with the upper section of the latter and also with a blow-off circuit also connected with the upper section of the container. Said blow-off circuit is independent of the circuit setting the distributor under pressure, so as to allow the exhaust of the pulverulent material remaining in the container, without any damage to the measuring apparatus which are connected with the first-mentioned circuit setting the distributor under pressure. At the lower end of the distributor is located a fluidizing arrangement which allows the pulverulent material to flow out easily through a lower port opening into an output pipe for the ulterior conveyance of the material.

The present invention has for its object to replace manual operation of the valves or cocks controlling the circuits for setting the distributor under pressure and for blowing off the latter respectively, by automatically operating means which allow obtaining an automatic adjustment of the throughput of pulverulent material flowing out of the distributor, when the value of the conveying pressure serves as a measure of the throughput of pulverulent material.

This, and other objects and advantages are obtained in accordance with the invention by an automatic adjusting device for a distributor of pulverulent material under pressure, said device comprising in combination a pressure regulator opening into the pipe feeding the conveying gas for the distributor at a point ahead of the point of injection of the pulverulent material out of the container into said pipe, and means whereby the said regulator is adapted to act on two valves inserted respectively in the circuit setting the distributor under pressure and in the blow-off circuit, so as to keep during a predetermined period the pressure in the gas-containing pipe at a constant value at the point connected with the regulator.

To allow a better understanding of the invention, a preferred embodiment will now be disclosed by way of example and by no means in a binding sense, reference being made to the accompanying drawing, the single figure of which illustrates diagrammatically a distributor of pulverulent material under pressure as controlled by the automatic adjusting means according to the invention.

As apparent from the drawing, the container 1 subjected to pressure and filled with pulverulent material through means which are not illustrated, includes a fluidizing arrangement 2. The gas is fed through the pipe 3 which opens directly into the pipe conveying the material beyond the distributor 1. The throughput of gas is measured by an adjusting flowmeter 4 and its value is maintained at a constant figure by the regulating valve 5 controlled by said flowmeter. A branch pipe 6 connected with the main pipe 3 supplies permanently the distributor 1 with a reduced flow of gas for fluidizing purposes. The fluidized pulverulent material flows out through the port 7 into the conveying pipe. The branch pipe 8 serves for feeding gas into the upper end of the distributor and for setting the latter under pressure, the throughput of gas in said pipe being adjusted by the regulating valve 9. Lastly, the pipe 10 controlled by the adjusting valve 11 serves for blowing off purposes.

According to the invention, there is connected with the conveying pipe 3 at a point ahead of the port 7 a regulating pressure gauge 12. The latter is adapted to compare the actual pressure in the pipe 3 with the desired value for said pressure and it acts on the extent of opening of the valve 9 or 11, according as to whether the measured pressure is lower or higher than the desired pressure. In the example illustrated, the pressure gauge 12 acts in the conventional manner on the valves 9 and 11, through the agency of variations of pressure of compressed air. Obviously, any other means for acting at a distance may be used, such as an electric relay or the like.

Obviously, it is possible, without unduly widening the scope of the invention, to imagine various detail modifications and improvements and also to substitute equivalent means for those described.

What I claim is:

1. In a distributor of pulverulent material, the combination of a container, a pipe conveying a fluid under pressure and into which said container opens, branch pipes connecting said pipe ahead of the point into which the container opens into the latter, respectively with the upper end of the container to set the latter under pressure and with a point slightly above the bottom of the container to set the particles of material to be conveyed into a fluidized condition, pressure sensing means communicating with a checking point of the conveyor pipe located just before the point at which the container opens into said pipe for sensing the pressure of the fluid passing through said conveyor pipe at said checking point, a control valve in the first branch pipe, a blow-off pipe opening into the upper end of the container, a valve controlling said blow-off pipe, and means operatively connected to said pressure sensing means and both of said valves for selectively controlling said valves in dependence on the fluid pressure at said checking point so as to automatically maintain the pressure in said container at a preselected relation to the fluid pressure at said point.

2. In a distributor of pulverulent material, the combination of a container, a pipe conveying a fluid under pressure and into which said container opens, branch pipes connecting the said pipe ahead of the point into which the container opens into the latter, respectively with the upper end of the container to set the latter under pressure and with a point slightly above the bottom of the container to set the particles of material to be conveyed into a fluidized condition, pressure sensing means communicating with a checking point of the conveyor pipe located just before the point at which the container opens into said pipe for sensing the pressure of the fluid passing through said conveyor pipe at said checking point, a control valve in the first branch pipe, a blow-off pipe opening into the upper end of the container, a valve controlling said blow-off pipe, and pneumatic means operatively connected to said pressure sensing means and both of said valves for selectively controlling said valves in dependence on the fluid pressure at said checking point so as to automatically maintain the pressure in said container at a preselected relation to the fluid pressure at said point.

3. In a distributor for pulverulent material, in combination, an upright fluid tightly closed container adapted to contain the pulverulent material and having an outlet end at the bottom thereof; pipe means for conveying a fluid under pressure and communicating intermediate the ends thereof with said outlet end of said container; a pair of branch pipes each communicating at one end thereof with said pipe means upstream of the point at which said outlet end communicates with said pipe means, one of said branch pipes communicates at the other end thereof with the interior of said container in the region of the top of the latter and the other of said branch pipes communicates with the interior of said container at a point slightly above the bottom thereof for rendering the material above said outlet end into fluidized condition; a blow-off pipe communicating with the interior of said container in the region of the top thereof; fluid flow regulating means in said pipe means between the points at which said branch pipes and said outlet end of said container communicates with said pipe means; a first control valve in said one branch pipe; a second control valve in said blow-off pipe; pressure sensing means communicating with said pipe means at a checking point downstream of said fluid flow regulating means and upstream of said point at which said outlet end communicates with said pipe means for sensing the fluid pressure at said checking point; and means operatively connected to said valves and said pressure sensing means for selectively regulating said valves in dependence on the fluid pressure at said checking point so as to automatically maintain the pressure in said container at a preselected relation to the fluid pressure measured by said pressure sensing means.

References Cited in the file of this patent

UNITED STATES PATENTS

| 2,897,009 | Gianning | July 28, 1959 |
| 2,919,159 | Lacroix | Dec. 29, 1959 |